(12) United States Patent
Zou et al.

(10) Patent No.: US 12,209,301 B1
(45) Date of Patent: Jan. 28, 2025

(54) DEVICE FOR SURFACE STRENGTHENING OF METAL PLATE BASED ULTRASONIC VIBRATION

(71) Applicants: Inner Mongolia University of Technology, Hohhot (CN); China Jiliang University, Hangzhou (CN)

(72) Inventors: Yunhe Zou, Hohhot (CN); Qibing Wang, Hangzhou (CN); Shufeng Tang, Hohhot (CN); Shijie Guo, Hohhot (CN); Jianxin Wu, Hohhot (CN); Haitang Cen, Hohhot (CN); Jianguo Qin, Hohhot (CN); Yifang Wang, Hohhot (CN); Xiaojuan Song, Hohhot (CN); Huaqiang Li, Hohhot (CN); Yuezheng Lan, Hohhot (CN); Xiaodong He, Hohhot (CN); Wenzhi Zhang, Hohhot (CN); Xiaowen Song, Hohhot (CN); He Lyu, Hohhot (CN); Xuewei Zhang, Hohhot (CN); Yongga A, Hohhot (CN)

(73) Assignees: Inner Mongolia University of Technology, Hohhot (CN); China Jiliang University, Hangzhou (CN)

( * ) Notice: Subject to any disclaimer, the term of this patent is extended or adjusted under 35 U.S.C. 154(b) by 0 days.

(21) Appl. No.: 18/408,569

(22) Filed: Jan. 10, 2024

(30) Foreign Application Priority Data

Jul. 24, 2023 (CN) .......................... 202310910444.8

(51) Int. Cl.
*C22F 3/00* (2006.01)
*B26D 7/08* (2006.01)

(52) U.S. Cl.
CPC ................ *C22F 3/00* (2013.01); *B26D 7/086* (2013.01)

(58) Field of Classification Search
CPC .............. C22F 3/00; B26D 7/086; B23C 1/00
(Continued)

(56) References Cited

U.S. PATENT DOCUMENTS

| 5,733,074 A | * | 3/1998 | Stock | ........................ | B24B 1/04 |
| | | | | | 408/129 |
| 2016/0052108 A1 | * | 2/2016 | Miess | ........................ | B22F 7/06 |
| | | | | | 51/307 |
| 2018/0304308 A1 | * | 10/2018 | Ohnishi | ................ | B06B 1/0618 |

FOREIGN PATENT DOCUMENTS

CN 216881880 U 7/2022

OTHER PUBLICATIONS

CNIPA, Notification of a First Office Action for CN202310910444.8, Aug. 25, 2023.
(Continued)

*Primary Examiner* — Nhat Chieu Q Do
(74) *Attorney, Agent, or Firm* — Hemisphere Law, PLLC; Zhigang Ma (57) ABSTRACT

A device is for surface strengthening of a metal plate based ultrasonic vibration. The device includes an ultrasonic vibration tool holder and a cutting tool. The ultrasonic vibration tool holder is internally provided with an ultrasonic transducer and an ultrasonic booster; the ultrasonic transducer is configured to transmit vibration to the ultrasonic booster, the ultrasonic booster is configured to drive longitudinal torsion vibration of the cutting tool; an end of the ultrasonic booster facing towards the cutting tool is provided with an adjustment assembly configured for adjusting a longitudinal torsion angle and a rotation speed. Since the device includes the adjustment assembly, the longitudinal torsion angle and the rotation speed of the device can be adjusted according to different processing requirements, so as to perform ultrasonic vibration extrusion strengthening on surfaces of tita-
(Continued)

nium alloy plates and improve surface integrity including microhardness and residual stress.

5 Claims, 7 Drawing Sheets

(58) Field of Classification Search
USPC .......................................................... 451/165
See application file for complete search history.

(56) References Cited

OTHER PUBLICATIONS

Inner Mongolia University of Technology (Applicant), Reply to Notification of a First Office Action for CN202310910444.8, w/ replacement claims, Aug. 28, 2023.
Inner Mongolia University of Technology (Applicant), Supplemental Reply to Notification of a First Office Action for CN202310910444.8, w/ (allowed) replacement claims, Sep. 6, 2023.
CNIPA, Notification to grant patent right for invention in CN202310910444.8, Sep. 11, 2023.

* cited by examiner

DEVICE FOR SURFACE STRENGTHENING OF METAL PLATE BASED ULTRASONIC VIBRATION

CROSS-REFERENCE TO RELATED APPLICATION

This application claims priority to Chinese Patent Application No. 202310910444.8, filed on Jul. 24, 2023, which is herein incorporated by reference in its entirety.

TECHNICAL FIELD

The disclosure relates to the technical field of metal processing devices, specifically to a device for surface strengthening of a metal plate based ultrasonic vibration.

BACKGROUND

Particle-reinforced titanium matrix composites (PTMCs) are a new type of composite materials obtained by adding dispersed reinforcement particles having characteristics of high strength, high hardness, and high modulus into an alloy matrix. Due to excellent physical and mechanical properties such as high specific modulus, high specific strength, fatigue resistance and corrosion resistance, PTMCs are widely used in aerospace field, automotive field, marine field, biomedical field, and other important fields. However, due to the addition of reinforcement particles, PTMCs have some problems including poor machinability, high cutting temperature, large cutting force, serious tool wear, low machining accuracy, and poor surface quality.

Therefore, titanium alloy processing is difficult, and traditional processing methods are no longer suitable for processing titanium alloys. Ultrasonic longitudinal torsion vibration surface strengthening technology introduces ultrasonic vibration into traditional surface strengthening technology, allowing traditional surface strengthening technology to achieve regular longitudinal torsional vibration impact and certain plastic deformation of a workpiece surface to achieve a purpose of strengthening the surface performance of the workpiece. By strengthening surface metallographic structures of the workpiece based on ultrasonic vibration, microhardness and residual stress of the workpiece can be improved, thereby improving a fatigue life of the workpiece.

In the ultrasonic longitudinal torsion vibration surface strengthening technology, there are two-dimensional vibrations including longitudinal vibration and torsional vibration. Impacts of the longitudinal vibration can enhance the microhardness and residual stresses of a metal surface. Impacts of the torsional vibration can generate torsional sliding on the metal surface while the longitudinal impacts occur, improving surface roughness and improving the circumferential residual stresses of the metal surface. In the prior art, an ultrasonic booster is combined with an ultrasonic transducer to change an amplitude of ultrasonic vibration. Main functions of the ultrasonic booster are to amplify a particle displacement or a particle velocity of mechanical vibration, and to focus ultrasonic energy on a smaller area, that is, focusing energy. However, existing ultrasonic boosters have the following shortcomings.

The existing ultrasonic boosters have a constant longitudinal torsion angle and a constant rotation speed after manufacturing, so that the existing ultrasonic boosters cannot be adjusted according to actual situations, making the existing ultrasonic boosters unsuitable for different processing requirements.

SUMMARY

A purpose of the disclosure is to provide a device for surface strengthening of a metal plate based ultrasonic vibration, aiming to solve the problem mentioned in the background.

In order to achieve the above purpose, the disclosure provides the following technical solutions. A device for surface strengthening of a metal plate based ultrasonic vibration is provided. The device includes an ultrasonic vibration tool holder and a cutting tool. The ultrasonic vibration tool holder is internally provided with an ultrasonic transducer and an ultrasonic booster. The ultrasonic transducer is configured to transmit vibration to the ultrasonic booster. The ultrasonic booster is configured to drive longitudinal torsion vibration of the cutting tool. An end of the ultrasonic booster facing towards the cutting tool is provided with an adjustment assembly configured for adjusting a longitudinal torsion angle and a rotation speed.

In an embodiment, the adjustment assembly includes two ring sleeves disposed at a lower end of the ultrasonic booster. The two ring sleeves are fixed on the ultrasonic vibration tool handle through a bracket, and the two ring sleeves are not in contact with the ultrasonic booster. Opposite sides of the two ring sleeves are rotatably connected to two rotation discs respectively. A control mechanism is configured to drive the two rotation discs to rotate in reverse directions, and the control mechanism is disposed on the bracket. Multiple slide rail assemblies are installed between the two rotation discs for adjusting the longitudinal torsion angle. A middle of each slide rail assembly of the multiple slide rail assemblies is slidably connected to an end of a longitudinal torsion guide rod, and another end of the longitudinal torsion guide rod is fixed on the ultrasonic booster.

In an embodiment, the control mechanism includes a reverse bevel gear, upper-lower bevel gears, and upper-lower gears. The reverse bevel gear is driven by a motor, and the reverse bevel gear is meshed with the upper-lower bevel gears arranged in parallel. Each of the upper-lower bevel gears is fixedly connected to a corresponding one of upper-lower gears through a shaft. The reverse bevel gear, the upper-lower bevel gears, and the upper-lower gears are disposed in a control box. The control box is fixed on the bracket. A periphery of each of the two rotation discs is provided with teeth, and a part of each of the upper-lower gears outside the control box is meshed with a corresponding one of the two rotation discs through the teeth.

In an embodiment, the slide rail assembly includes a longitudinal torsion slide rail and two auxiliary adjustment rods. A middle of the longitudinal torsion slide rail is slidably connected to the longitudinal torsion guide rod. The longitudinal torsion slide rail is slidably connected to the two auxiliary adjustment rods. The two auxiliary adjustment rods are centrally symmetrical. An end of each of the two auxiliary adjustment rods is slidably connected to the longitudinal torsion slide rail. Another end of each of the two auxiliary adjustment rods is hinged with a corresponding one of the two rotation discs.

In an embodiment, the longitudinal torsion slide rail is provided with a limit assembly configured to prevent the longitudinal torsion slide rail from shifting due to a weight of the longitudinal torsion slide rail. The limit assembly includes limit mechanisms and a limit ring. Each of the limit mechanisms is disposed on a corresponding one longitudinal torsion slide rail. The corresponding one longitudinal torsion slide rail is hinged with the limit ring surrounding the ultrasonic booster through the limit mechanism. The limit ring is fixedly connected to the bracket.

In an embodiment, the limit mechanism includes multiple support rods, a support plate, and a rotation shaft. An end of each of the multiple support rods is fixedly connected a middle position of the longitudinal torsion slide rail. Another end of each of the multiple support rods is fixedly connected to a surface of the support plate. Another surface of the support plate is fixedly connected to an end of the rotation shaft, and another end of the rotation shaft is rotatably connected to the limit ring.

In an embodiment, the cutting tool is elliptical, plate-shaped, spherical, or arc-shaped.

Compared with the prior art, the disclosure has the following beneficial effects. The disclosure includes the adjustment assembly and the control mechanism configured to drive the two rotation discs to rotate in reverse directions. The reverse rotation of the two rotation discs drives the slide rail assemblies to rotate around centers of the longitudinal torsion guide rods and adjust an angle. By sliding the longitudinal torsion guide rods in the respective slide rail assemblies, the ultrasonic booster can drive the longitudinal torsion vibration of cutting tool, thereby controlling the longitudinal torsion angle and the rotation speed of the ultrasonic booster. The more the slide rail assembly deviates from a state perpendicular to the rotation discs, the greater the longitudinal torsion angle is, and the faster the rotation speed is. The closer the slide rail assembly is to a state perpendicular to the rotation discs, the smaller the longitudinal torsion angle is, and the slower the rotation speed is. The longitudinal torsion angle and the rotation speed can be adjusted according to different processing requirements, so as to perform ultrasonic vibration extrusion strengthening on surfaces of the titanium alloy plates and improve surface integrity including microhardness and residual stress.

DESCRIPTION OF REFERENCE NUMERALS 1-ring sleeve; 2-rotation disc; 3-bracket; 4-slide rail assembly; 401-longitudinal torsion slide rail; 402-auxiliary adjustment rod; 5-longitudinal torsion guide rod; 6-limit mechanism; 601-support rod; 602-support plate; 6021-surface; 6022-another surface; 603-rotation shaft; 7-limit ring; 8-control mechanism; 801-control box; 802-reverse bevel gear; 803-upper-lower bevel gears; 804-upper-lower gears; 9-ultrasonic vibration tool holder; 901-ultrasonic transducer; 902-ultrasonic booster; 10-cutting tool; 11-motor; 12-shaft.

DETAILED DESCRIPTION OF EMBODIMENTS

The following will provide a clear and complete description of the technical solution in the embodiments of the disclosure, in conjunction with the attached drawings. Apparently, the described embodiments are only a part of the embodiments of the disclosure, not all of them. Based on the embodiments in the disclosure, all other embodiments obtained by those skilled in the art without creative work should fall within the scope of protection of the disclosure.

Referring to FIG. 1 to FIG. 7, in order to solve the problem that the existing ultrasonic booster is not suitable for different grinding requirements since the longitudinal torsion angle and the rotation speed are constant and cannot be adjusted according to actual conditions, and achieve a purpose that the longitudinal torsion angle and the rotation speed can be adjusted according to requirements so as to adapt to different processing requirements, the disclosure provides a technical solution: a device for surface strengthening of a metal plate based ultrasonic vibration. The device includes an ultrasonic vibration tool holder 9 and a cutting tool 10. The ultrasonic vibration tool holder 9 is internally provided with an ultrasonic transducer 901 and an ultrasonic booster 902. The ultrasonic transducer 901 is configured to transmit vibration to the ultrasonic booster 902, and the ultrasonic booster 902 is configured to drive longitudinal torsion vibration of the cutting tool 10. An end of the ultrasonic booster 902 facing towards the cutting tool 10 is provided with an adjustment assembly configured for adjusting a longitudinal torsion angle and a rotation speed. The cutting tool 10 is elliptical, plate-shaped, spherical, or arc-shaped. In the disclosure, electrical equipment such as motors, cylinders, and push rods are all of the existing models. When in use, the longitudinal torsion angle and rotation speed are adjusted using an adjustment assembly based on factors such as the cutting tool 10 used and a required grinding effect of a processed material. After adjustment, the ultrasonic vibration tool handle 9 is connected to a machine tool or be held by hands of a user, and the cutting tool 10 connected to the ultrasonic vibration tool handle 9 are used to grind the workpiece.

Figure 1:
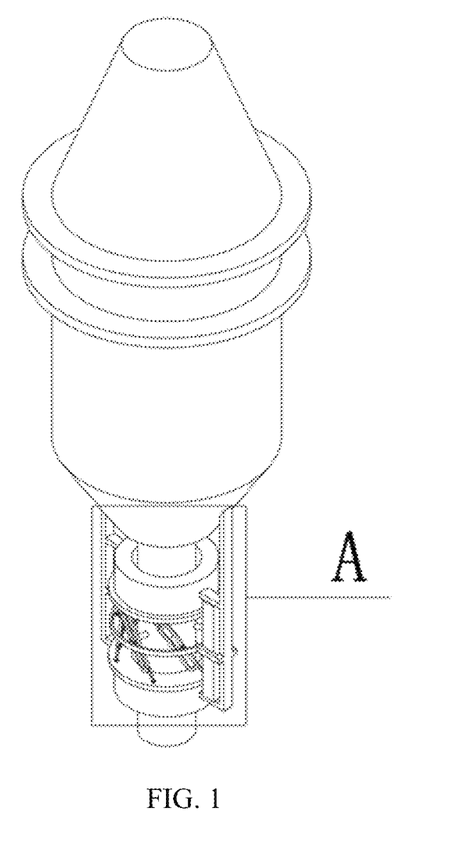
FIG. 1 illustrates a main structural schematic diagram of the disclosure.
Figure 2:
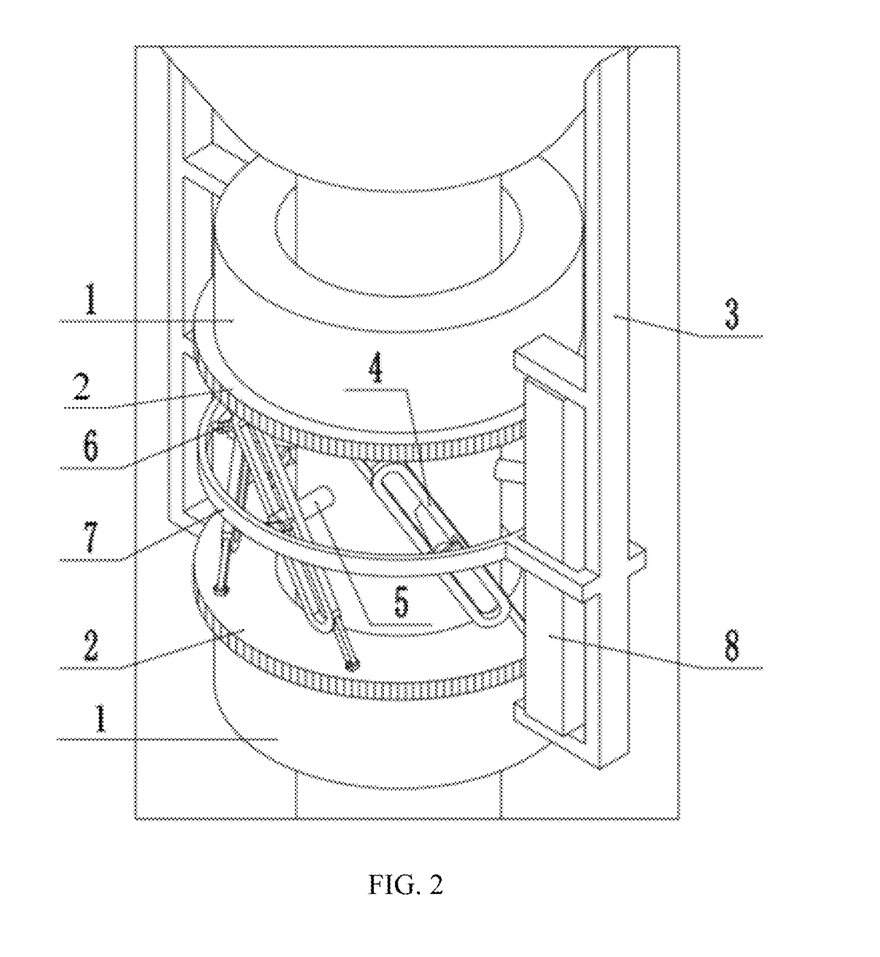
FIG. 2 illustrates a locally enlarged image of a part A in FIG. 1.

Referring to FIG. 2, in order to achieve the adjustments of the longitudinal torsion angle and rotation speed, the device is provided with an adjustment assembly. The adjustment assembly includes two ring sleeves 1 disposed at the end of the ultrasonic booster 902. The two ring sleeves 1 are fixed on the ultrasonic vibration tool handle through a bracket 3, and the two ring sleeves 1 are not in contact with the ultrasonic booster 902. Opposite sides of the two ring sleeves 1 are rotatably connected to two rotation discs 2 respectively. A control mechanism 8 is configured to drive the two rotation discs 2 to rotate in reverse directions, and the control mechanism 8 is disposed on the bracket 3. Multiple slide rail assemblies 4 are installed between the two rotation discs 2 for adjusting the longitudinal torsion angle. A middle of each slide rail assembly 4 of the multiple slide rail assemblies 4 is slidably connected to an end of a longitudinal torsion guide rod 5, and another end of the longitudinal torsion guide rod 5 is fixed on the ultrasonic booster 902. When the device needs to be adjusted, the longitudinal torsion guide rod 5 is located at a center of the slide rail assembly 4, and then the control mechanism 8 is turned on to drive the two rotation discs 2 to rotate reversely. The reverse rotation of the two rotation discs 2 drives the slide rail assemblies 4 to rotate around centers of the longitudinal torsion guide rods 5 and adjust an angle. By sliding the longitudinal torsion guide rods 5 in the respective slide rail assemblies, the ultrasonic booster 902 can drive the longitudinal torsion vibration of the cutting tool 10, thereby controlling the longitudinal torsion angle and the rotation speed of the ultrasonic booster 902. The more the slide rail assembly 4 deviates from a state perpendicular to the rotation discs 2, the greater the longitudinal torsion angle is, and the faster the rotation speed is. The closer the slide rail assembly 4 is to a state perpendicular to the rotation discs 2, the smaller the longitudinal torsion angle is, and the slower the rotation speed is.

Figure 5:
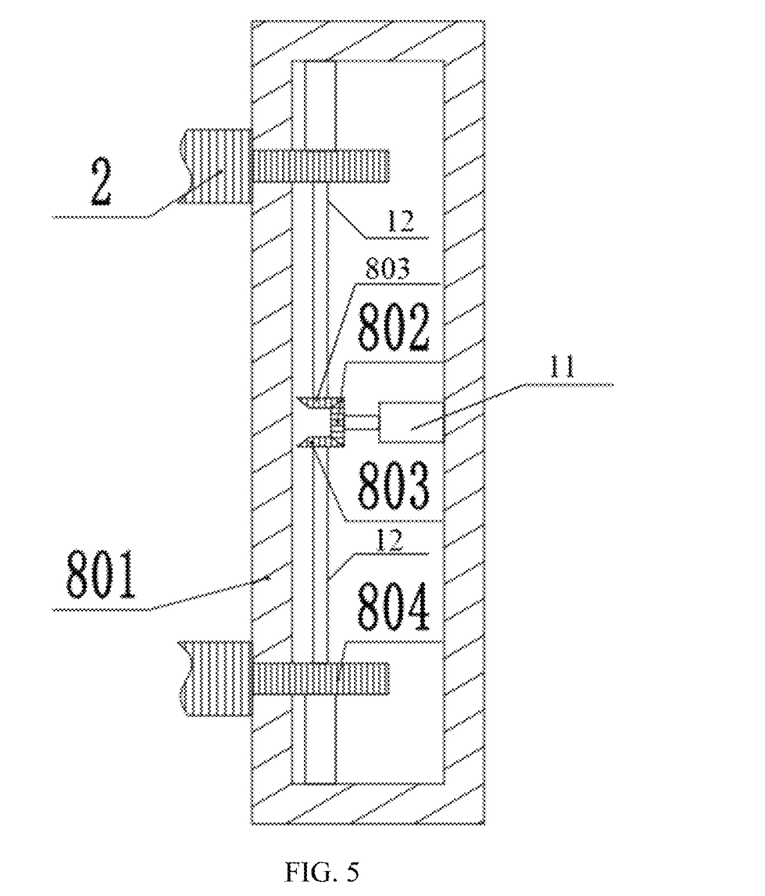
FIG. 5 illustrates a structural schematic diagram of a control mechanism of the disclosure.
Figure 6:
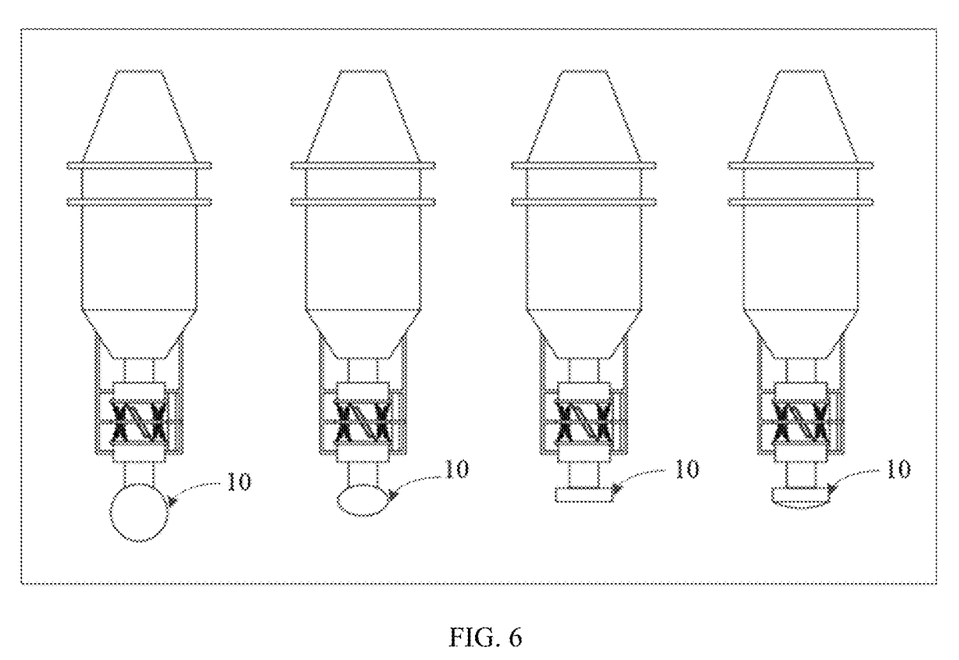
FIG. 6 illustrates a structural schematic diagram of different cutting tools of the disclosure.
Figure 7:
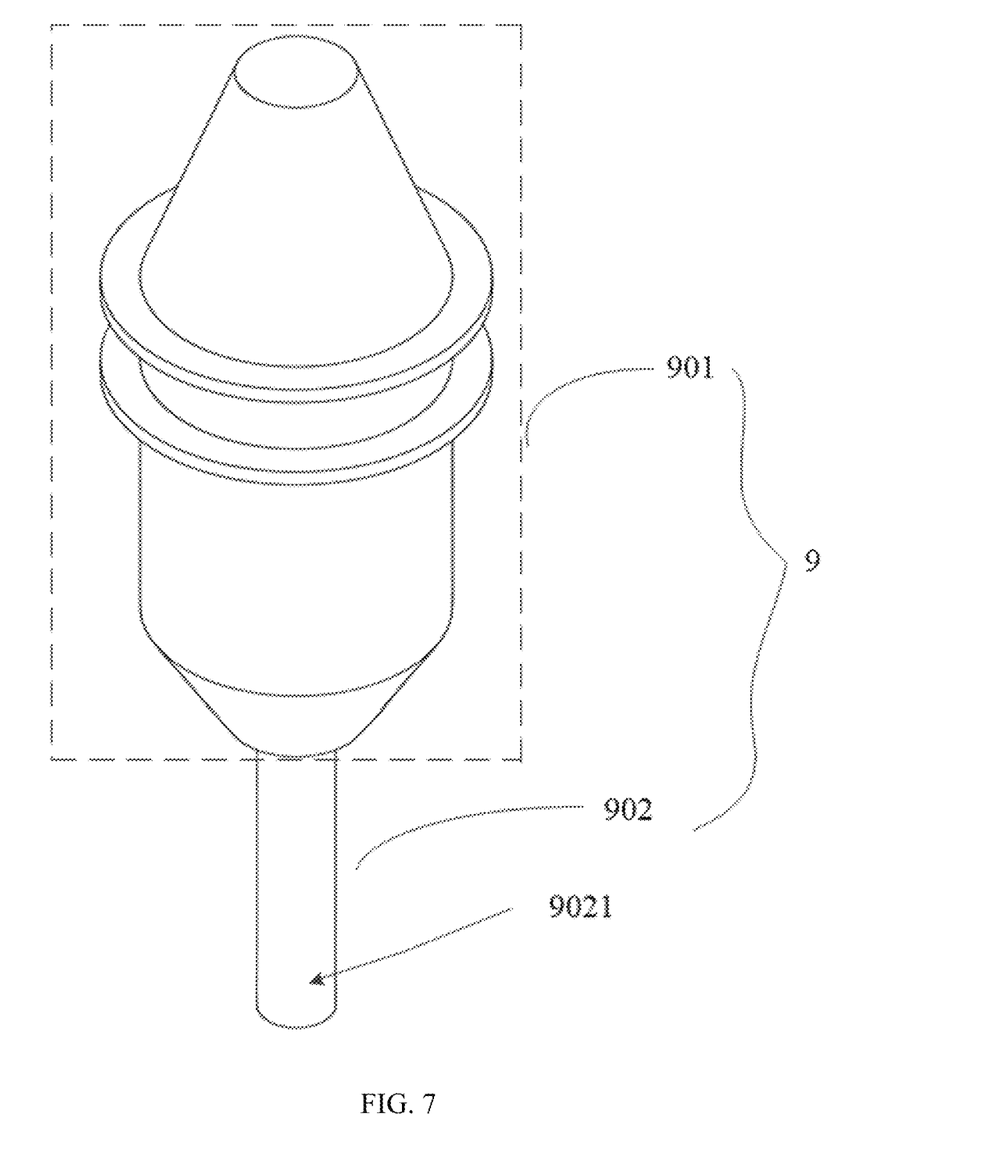
FIG. 7 illustrates a structural schematic diagram of an ultrasonic vibration tool holder in FIG. 1 of the disclosure.

Referring to FIG. 5, in order to enable the two rotation discs 2 to be rotated in reserve directions, the two rotation discs 2 are locked tightly when the two rotation discs 2 are not rotated, and each of the slide rail assemblies 4 can be maintained in a tilted angle. The device further includes the control mechanism 8. The control mechanism 8 includes a reverse bevel gear 802, upper-lower bevel gears 803, and upper-lower gears 804. The reverse bevel gear 802 is driven by a motor 11. The reverse bevel gear 802 is meshed with the upper-lower bevel gears 803 arranged in parallel. Each of the upper-lower bevel gears 803 is fixedly connected to a corresponding one of upper-lower gears 804 through a shaft 12. The reverse bevel gear 802, the upper-lower bevel gears 803, and the upper-lower gears 804 are disposed in a control box 801. The control box 801 is fixed on the bracket 3. A periphery of each of the two rotation discs 2 is provided with teeth, and a part of each of the upper-lower gears 804 outside the control box 801 is meshed with a corresponding one of the two rotation discs 2 through the teeth. When the device is adjusted, the motor 11 is turned on. The motor 11 adopts a stepper motor, using the existing model. The motor 11 drives the reverse bevel gear 802 to rotate, and the reverse bevel gear 802 drives two upper-lower bevel gears 803 to rotate, causing both upper-lower bevel gears 803 to rotate in reverse directions at the same time. The upper-lower gears 804 are connected to the control box 801 through the shafts 12, and the upper-lower gears 804 drive the rotation discs 2 to rotate, causing the two rotation discs 2 to rotate in reverse directions at the same time to adjust the angles of the slide rail assemblies 4.

Figure 3:
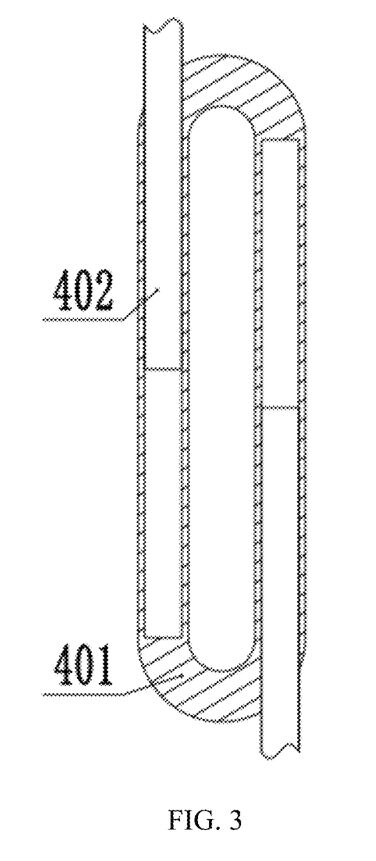
FIG. 3 illustrates a structural schematic diagram of a slide rail assembly of the disclosure.
Figure 4:
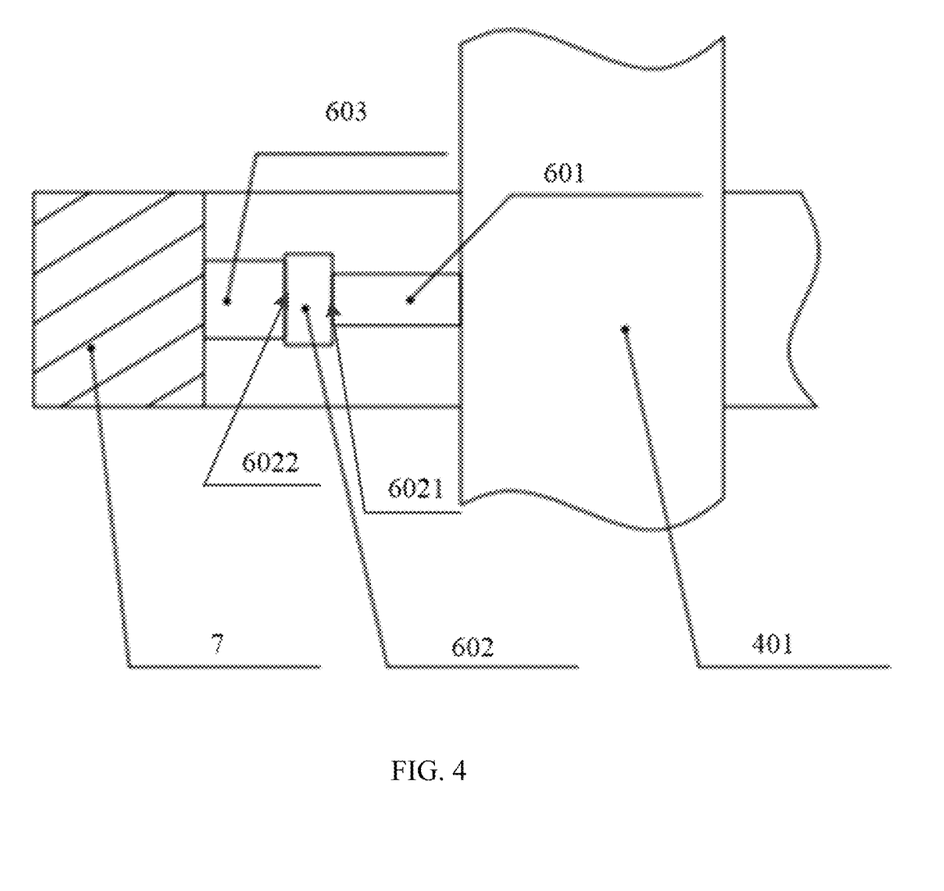
FIG. 4 illustrates a structural schematic diagram of a limit assembly of the disclosure.

Referring to FIG. 3, in order to facilitating adjusting angles of the slide rail assemblies 4 and sliding the slide rail assemblies 4. The slide rail assembly 4 includes a longitudinal torsion slide rail 401 and two auxiliary adjustment rods 402. A middle of the longitudinal torsion slide rail 401 is slidably connected to the longitudinal torsion guide rod 5. The longitudinal torsion slide rail 401 is slidably connected to the two auxiliary adjustment rods 402. The two auxiliary adjustment rods 402 are centrally symmetrical. An end of each of the two auxiliary adjustment rods 402 is slidably connected to the longitudinal torsion slide rail 401. Another end of each of the two auxiliary adjustment rods 402 is hinged with a corresponding one of the two rotation discs 2. When the rotation discs 2 are rotated to adjust the angle of each of the slide rail assemblies 4, a length of the longitudinal torsion slide rail 401 does not change, which ensures that an inner side of the longitudinal torsion slide rail 401 is smooth and without protrusions, so that the longitudinal torsion guide rod 5 can slide in the longitudinal torsion slide rail 401 smoothly. The length of the longitudinal torsion slide rail 401 after the angle adjustment is supplemented by the auxiliary adjustment rods 402. The length of the longitudinal torsion slide rail 401 exceeds the maximum sliding distance of the longitudinal torsion guide rod 5, so that the longitudinal torsion guide rod 5 will not collide with the longitudinal torsion slide rail 401 during the grinding process of the workpiece Referring to FIG. 4, after the angle adjustment, in order to prevent the longitudinal torsion slide rail 401 from falling off and therefore the longitudinal torsion slide rail 401 are not adapted to the sliding of the longitudinal torsion guide rod 5, the longitudinal torsion slide rail 401 is provided a limit assembly configured to prevent the longitudinal torsion slide rail 401 from shifting due to a weight of the longitudinal torsion slide rail 401. The limit assembly includes limit mechanisms 6 and a limit ring 7. Each of the limit mechanisms 6 is disposed on a corresponding one longitudinal torsion slide rail 401. The corresponding one longitudinal torsion slide rail 401 is hinged with the limit ring 7 surrounding the ultrasonic booster 902 through the limit mechanism 6. The limit ring 7 is fixedly connected to the bracket 3. The limit mechanism 6 includes multiple support rods 601, a support plate 602, and a rotation shaft 603. An end of each of the multiple support rods 601 is fixedly connected a middle position of the longitudinal torsion slide rail 401. Another end of each of the multiple support rods 601 is fixedly connected to a surface 6021 of the support plate 602. Another surface 6022 of the support plate 602 is fixedly connected to an end of the rotation shaft 603. Another end of the rotation shaft 603 is rotatably connected to the limit ring 7. When the longitudinal torsion slide rail 401 is rotated, the longitudinal torsion guide rod 5 is on the same axis as the rotation shaft 603. The longitudinal torsion slide rail 401 drives the multiple support rods 601 to rotate, the multiple support rods 601 drive the support plate 602 to rotate, and the support plate 602 drives the rotation shaft 603 to rotate. The rotation shaft 603 is rotatably connected to the limit ring 7, so that the longitudinal torsion slide rail 401 is always located between the two rotation discs 2 and is always matched with the longitudinal torsion guide rod 5. A distance between an end of the longitudinal torsion slide rail 401 and one of the rotation discs 2 is always equal to a distance between another end of the longitudinal torsion slide rail 401 and another one of the rotation discs 2.

Although embodiments of the disclosure have been shown and described, it can be understood by those skilled in the art that changes, modifications, replacements, and variations can be made to these embodiments without departing from the principles and spirit of the disclosure. The scope of the disclosure is limited by the claims and equivalents thereof.

What is claimed is:

1. A device for surface strengthening of a metal plate, the device comprising: an ultrasonic vibration tool holder (9) and a strengthening tool (10); wherein the ultrasonic vibration tool holder (9) is internally provided with an ultrasonic transducer (901) and an ultrasonic booster (902); the ultrasonic transducer (901) is configured to transmit vibration to the ultrasonic booster (902), the ultrasonic booster (902) is configured to drive longitudinal torsion vibration of the strengthening tool (10), and an end (9021) of the ultrasonic booster (902) facing towards the strengthening tool (10) is provided with an adjustment assembly configured for adjusting a longitudinal torsion angle of the strengthening tool (10) and a rotation speed of the strengthening tool (10);

wherein the adjustment assembly comprises two ring sleeves (1) disposed at the end (9021) of the ultrasonic booster (902); the two ring sleeves (1) are fixed on the ultrasonic vibration tool holder (9) through a bracket (3), and the two ring sleeves (1) are not in contact with the ultrasonic booster (902); opposite sides of the two ring sleeves (1) are rotatably connected to two rotation discs (2) respectively; a control mechanism (8) is configured to drive the two rotation discs (2) to rotate in reverse directions, and the control mechanism (8) is disposed on the bracket (3); a plurality of slide rail assemblies (4) are installed between the two rotation discs (2) for adjusting the longitudinal torsion angle; a middle of each slide rail assembly (4) of the plurality of slide rail assemblies (4) is slidably connected to an end of a guide rod (5), and another end of the guide rod (5) is fixed on the ultrasonic booster (902);

wherein the slide rail assembly (4) comprises a slide rail (401) and two auxiliary adjustment rods (402); a middle of the slide rail (401) is slidably connected to the guide rod (5); the slide rail (401) is slidably connected to the two auxiliary adjustment rods (402); the two auxiliary adjustment rods (402) are centrally symmetrical; an end of each of the two auxiliary adjustment rods (402) is slidably connected to the slide rail (401); and another end of each of the two auxiliary adjustment rods (402) is hinged with a corresponding one of the two rotation discs (2).

2. The device for surface strengthening of the metal plate as claimed in claim 1, wherein the control mechanism (8) comprises a control box (801), a reverse bevel gear (802), upper-lower bevel gears (803), and upper-lower gears (804); the reverse bevel gear (802) is driven by a motor (11), and the reverse bevel gear (802) is meshed with the upper-lower bevel gears (803) arranged in parallel; each of the upper-lower bevel gears (803) is fixedly connected to a corresponding one of upper-lower gears (804) through a shaft (12); the reverse bevel gear (802), the upper-lower bevel gears (803), and the upper-lower gears (804) are disposed in the control box (801); the control box (801) is fixed on the bracket (3); a periphery of each of the two rotation discs (2) is provided with teeth, and a part of each of the upper-lower gears (804) outside the control box (801) is meshed with a corresponding one of the two rotation discs (2) through the teeth.

3. The device for surface strengthening of the metal plate as claimed in claim 2, wherein the slide rail (401) is provided with a limit assembly configured to prevent the slide rail (401) from shifting due to a weight of the slide rail (401); the limit assembly comprises limit mechanisms (6) and a limit ring (7); each of the limit mechanisms (6) is disposed on a corresponding one slide rail (401); the corresponding one slide rail (401) is hinged with the limit ring (7) surrounding the ultrasonic booster (902) through the limit mechanism (6); and the limit ring (7) is fixedly connected to the bracket (3).

4. The device for surface strengthening of the metal plate as claimed in claim 3, wherein the limit mechanism (6) comprises a plurality of support rods (601), a support plate (602), and a rotation shaft (603); an end of each of the plurality of support rods (601) is fixedly connected a middle position of the slide rail (401); another end of each of the plurality of support rods (601) is fixedly connected to a surface (6021) of the support plate (602), another surface (6022) of the support plate (602) is fixedly connected to an end of the rotation shaft (603); and another end of the rotation shaft (603) is rotatably connected to the limit ring (7).

5. The device for surface strengthening of the metal plate as claimed in claim 2, wherein the strengthening tool (10) is elliptical, plate-shaped, spherical, or arc-shaped.

* * * * *